US009563179B2

(12) United States Patent
Matsue et al.

(10) Patent No.: US 9,563,179 B2
(45) Date of Patent: Feb. 7, 2017

(54) RADIO-CONTROLLED TIMEPIECE, METHOD OF OBTAINING DATE/TIME INFORMATION, AND RECORDING MEDIUM

(71) Applicant: CASIO COMPUTER CO., LTD., Tokyo (JP)

(72) Inventors: Takeshi Matsue, Tokyo (JP); Hideo Abe, Saitama (JP); Kazuaki Abe, Saitama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/963,449

(22) Filed: Dec. 9, 2015

(65) Prior Publication Data

US 2016/0187858 A1    Jun. 30, 2016

(30) Foreign Application Priority Data

Dec. 24, 2014  (JP) ................. 2014-260367
May 29, 2015   (JP) ................. 2015-109674

(51) Int. Cl.
*G04R 20/06*   (2013.01)
*G01S 19/25*   (2010.01)

(52) U.S. Cl.
CPC ............. *G04R 20/06* (2013.01); *G01S 19/256* (2013.01)

(58) Field of Classification Search
CPC ......... G04R 20/00; G04R 20/02; G04R 20/06; G01S 19/256
See application file for complete search history.

(56) References Cited

U.S. PATENT DOCUMENTS

| 7,649,812 B2* | 1/2010 | Baba ...................... G01S 19/34 342/357.48 |
| 2009/0015470 A1 | 1/2009 | Fujisawa |
| 2015/0168924 A1* | 6/2015 | Kato ..................... G04R 20/04 368/47 |
| 2015/0212495 A1* | 7/2015 | Kato ..................... G04R 20/04 368/47 |

FOREIGN PATENT DOCUMENTS

JP    2009-36748 A    2/2009

OTHER PUBLICATIONS

U.S. Appl. No. 14/963,459, filed Dec. 9, 2015.

* cited by examiner

*Primary Examiner* — Vit W Miska
(74) *Attorney, Agent, or Firm* — Chen Yoshimura LLP

(57) ABSTRACT

A radio-controlled timepiece, including: a radio wave reception unit that receives satellite waves and extracts an incoming code sequence formatted in a prescribed format from the received satellite waves; and a processor that generates in advance an expected code sequence that is expected to be part of the incoming code sequence and detects the expected code sequence within the incoming code sequence by sequentially comparing the expected code sequence with the incoming code sequence, the processor determining a present date/time, as indicated by the satellite waves, in accordance with a timing at which the detected code sequence occurs within the incoming code sequence as measured by time kept by the timepiece, wherein the expected code sequence includes codes that change with a transmission period during which time-related information that includes satellite date/time contained in the satellite waves, which is formatted in the prescribed format, is transmitted.

20 Claims, 7 Drawing Sheets

RADIO-CONTROLLED TIMEPIECE, METHOD OF OBTAINING DATE/TIME INFORMATION, AND RECORDING MEDIUM

BACKGROUND OF THE INVENTION

The present invention, in one aspect, relates to a radio-controlled timepiece that obtains date/time information by receiving radio waves from a positioning satellite, a method of obtaining date/time information, and a storage medium.

Conventionally, there is an electronic watch (radio-controlled timepiece) that accurately maintains the date/time that the watch counts by receiving radio waves from a navigation satellite (positioning satellite) related to GNSS (global navigation satellite system) and obtaining date/time information therefrom. Such a radio-controlled timepiece does not require manual operation by the user and can count date/time at various locations in the world and accurately maintain the displayed date/time.

However, in an electronic watch, the load involved in receiving satellite waves is significantly greater than the load involved in counting and displaying date/time. Dealing with the reception of satellite waves gives rise to the problem of increased battery size and other associated problems such as increase in the size and weight of the electronic watch. To address such problems, various types of technologies for reducing energy consumption have been developed so far.

One such technology for reducing energy consumption includes shortening the time required for receiving radio waves. Japanese Patent Application Laid-Open Publication No. 2009-36748 discloses a technology that receives a predefined portion of the signal including date/time information according to a signal format (navigation message) transmitted by the GPS satellites and that temporarily pauses reception while the GPS satellites are transmitting unnecessary information, for example.

In this process, to avoid misidentifying date/time, parity data for the data block that includes the predefined portion of the signal described above is obtained to ensure the integrity of the incoming data.

However, part of the data unrelated to the date/time information does not necessarily need to be obtained accurately. A reception method that demands the integrity of these unnecessary data using parity data is less efficient in obtaining the date/time information.

SUMMARY OF THE INVENTION

An aim of the present invention is to provide a radio-controlled timepiece that can obtain accurate date/time information more efficiently, a method of obtaining date/time information, and a recording medium.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present disclosure provides a radio-controlled timepiece, including: a radio wave reception unit that receives satellite waves and extracts an incoming code sequence formatted in a prescribed format from the received satellite waves; and a processor that generates in advance an expected code sequence that is expected to be part of the incoming code sequence and detects the expected code sequence within the incoming code sequence by sequentially comparing the expected code sequence with the incoming code sequence, the processor determining a present date/time, as indicated by the satellite waves, in accordance with a timing at which the detected code sequence occurs within the incoming code sequence as measured by time kept by the timepiece, wherein the expected code sequence includes codes that change with a transmission period during which time-related information that includes satellite date/time contained in the satellite waves, which is formatted in the prescribed format, is transmitted.

In another aspect, the present disclosure provides a radio-controlled timepiece including: a radio wave reception unit that receives satellite waves and extracts an incoming code sequence formatted in a prescribed format from the received satellite waves; a processor that generates in advance an expected code sequence that is expected to be part of the incoming code sequence and detects the expected code sequence within the incoming code sequence by sequentially comparing the expected code sequence with the incoming code sequence, the processor determining a present date/time, as indicated by the satellite waves, in accordance with a timing at which the detected code sequence occurs within the incoming code sequence as measured by time kept by the timepiece; and a storage unit that stores a reception history of most recently received satellite waves and a code sequence that is obtained from the most recently received satellite waves, wherein the processor determines, based on types of information represented by the code sequence that is stored in the storage unit, a part of the code sequence that does not change within a time interval between when the most recently received satellite waves were received and a present moment and includes at least a portion of the part of the code sequence in the expected code sequence.

It is to be understood that both the foregoing general description and the following detailed description are exemplary and explanatory, and are intended to provide further explanation of the invention as claimed.

DETAILED DESCRIPTION OF EMBODIMENTS

Below, embodiments of the present invention will be described with reference to the drawings.

Embodiment 1

Figure 1:
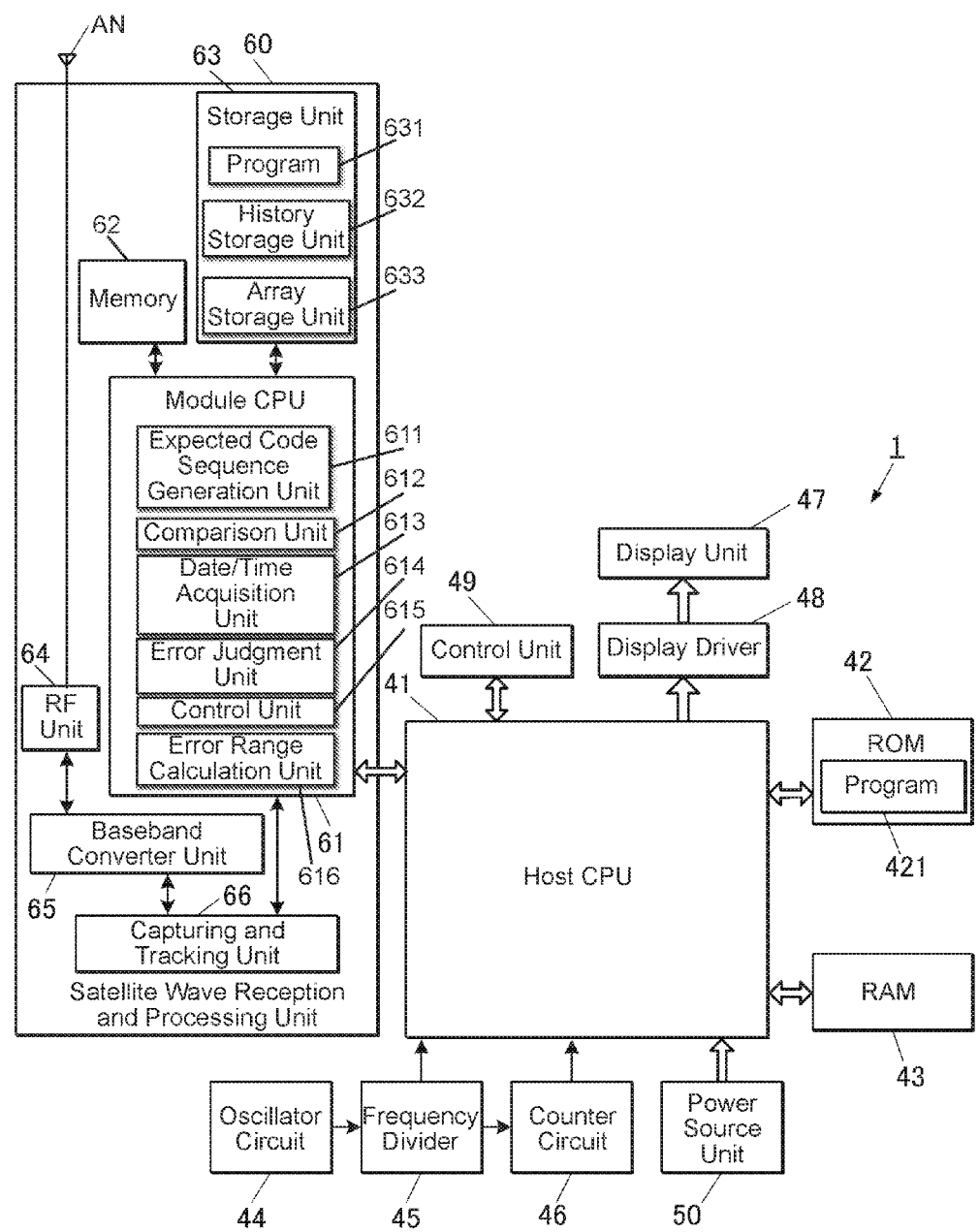
FIG. 1 is a block diagram showing an electronic watch according to embodiments of the present invention.

FIG. 1 is a block diagram showing a functional configuration of an electronic watch 1 according to Embodiment 1, which is a positioning device and a radio-controlled timepiece of the present invention.

The electronic watch 1 is a radio-controlled timepiece that can receive radio waves from at least American positioning satellites (referred to as GPS satellites below) related to GPS (global positioning system) and obtain date/time information.

The electronic watch 1 includes, a host CPU 41 (central processing unit; processor), a ROM 42 (read only memory), a RAM 43 (random access memory), an oscillator circuit 44, a frequency divider 45, a counter circuit 46 that function as a counter unit, a display unit 47, a display driver 48, an operation unit 49, a power source unit 50, a satellite wave reception and processing unit 60, an antenna AN, and the like.

The host CPU 41 carries out various types of arithmetic processing and controls the overall operation of the electronic watch 1. The host CPU 41 reads out control programs from the ROM 42, loads the programs to RAM 43, and execute various types of operation processing such as arithmetic control and display related to displaying date/time and other various functions. Furthermore, the host CPU 41 instructs the satellite wave reception and processing unit 60 to operate and receive radio waves from the positioning satellites and obtain date/time information and location information computed based on the received content.

The ROM 42 is a mask ROM, a rewritable non-volatile memory, or the like, and stores control programs and initial configuration data. The control programs include a program 421 used to control various types of processes for obtaining various types of data from the positioning satellites.

The RAM 43 is a volatile memory such as SRAM or DRAM. The RAM 43 stores data temporarily by providing working memory space for the host CPU 41 and stores various types of configuration data. The various types of configuration data include the settings for the home city where the electronic watch 1 is used and the settings related to whether daylight savings time should be implemented when computing and displaying date/time. A part or the whole of the various types of configuration data stored in the RAM 43 may be stored in a non-volatile memory.

The oscillator circuit 44 generates and outputs a predetermined frequency signal. A crystal oscillator is used in the oscillator circuit 44, for example.

The frequency divider circuit 45 takes an input frequency signal from the oscillator circuit 44 and generates an output frequency signal used by the counter circuit 46 and the host CPU 41. It may be possible for the frequency of this output signal to be changed on the basis of the settings of the host CPU 41.

The counter circuit 46 measures the current date/time by counting the input count of the prescribed frequency signal (clock signal) inputted from the frequency divider 45 and adding that value to the default value. The counter circuit 46 may be a unit that changes the value stored in the RAM using software or may be equipped with a dedicated counter circuit. Although there is no particular limit to the date/time counted by the counter circuit 46, it is either the cumulative time measured from a predefined timing, UTC date/time (coordinated universal time), the date/time of the home city set in advance, or the like. The date/time measured by the counter circuit 46 does not always need to be kept in "year month day, hour minute second" format. A clock signal inputted into the counter circuit 46 from the frequency divider circuit 45 is slightly off from the precise pace at which time passes. The magnitude of the error (rate) per day changes depending on operating conditions and temperature and is normally within +/−0.5 seconds.

The display unit 47 includes a display screen such as a liquid crystal display (LCD) or an organic EL (electroluminescent) display and executes display operations related to date/time and various types of functions by using dot matrix display, segment display, or a combination thereof.

Based on a control signal from the host CPU 41, the display driver 48 outputs a driver signal that matches the type of the display screen to the display unit 47, thereby instructing the display unit to perform display on the display screen.

The operation unit 49 receives an input operation by the user and outputs to the host CPU 41 an electronic signal that corresponds to the input operation as an input signal. The operation unit 49 includes a push-button switch or a crown, for example.

Alternatively, the display unit 47 and the operation unit 49 may be integrated. This integration can be achieved by first mounting the touch sensor on the display screen of the display unit 47, and second by enabling the display screen to function as a touch panel that outputs operation signals that correspond to contact point and contact manner involved in the contact behavior of the user detected by the touch sensor.

The power source unit 50 includes batteries and provides power needed in the operation of the electronic watch 1 to respective units of the watch at a given voltage. A solar panel and a rechargeable battery are used as the batteries for the power source unit 50. The solar panel generates electromotive force using incident light and supplies power to various units such as the host CPU 41. Also, when the solar panel generates surplus power, the power is stored in the rechargeable battery. When the possible amount of power that the solar panel can generate based on the amount of incident light available from an external source is less than the amount of power being consumed, the secondary battery supplies power. Alternatively, a non-rechargeable battery such as a button battery can be used as the battery.

The satellite wave reception and processing unit 60 is tuned to the radio waves from the positioning satellites via the antenna AN and receives the radio waves by identifying and capturing a C/A code (pseudo random noise) unique to each of the positioning satellites. Then, the satellite wave reception and processing unit demodulates and decodes navigation messages sent by the positioning satellites to obtain necessary data. The satellite wave reception and processing unit 60 includes a module CPU 61 (a processor including in terms of software or hardware or both) an expected code sequence generation unit 611, a comparison unit 612, a date/time acquisition unit 613, an error judgment unit 614, a control unit 615, an error range calculation unit 616), a memory 62, a storage unit 63 (a history storage unit 632, an array storage unit 633), an RF unit 64, a baseband converter unit 65, an capturing and tracking unit 66, and the like. The module CPU 61 includes the expected code sequence generation unit 611, the comparison unit 612, the date/time acquisition unit 613, the error judgment unit 614, the control unit 615, and the error range calculation unit 616. The expected code sequence generation unit 611, the comparison unit 612, the date/time acquisition unit 613, the error judgment unit 614, the control unit 615, and the error range calculation unit 616 may be a single CPU, there may be a separate CPU for carrying out each operation, or each operation can be carried out by the host CPU 41. The data stored in the storage unit 63 include programs 631, the history storage unit 632, and the array storage unit 633. The programs 631, the history storage unit 632, and the array storage unit 633 may be a single storage unit, a separate storage unit may be provided for each unit, or the programs 631 may be included in the data stored in the ROM 42, and the history storage unit 632 and the array storage unit 633 may be included in the data stored in the RAM 43.

The module CPU 61 controls the operations of the satellite wave reception and processing unit 60 according to control signals and configuration data input from the host CPU 41. The module CPU 61 reads out the necessary programs and configuration data from the storage unit 63, operates the RF unit 64, the baseband converter unit 65 and the capturing and tracking unit 66, and receives and demodulates the radio waves from respective positioning satellites to obtain the date/time information. In addition to obtaining the date/time information by decoding the received radio waves, the module CPU 61 can compare and match the demodulated incoming code sequence with a code sequence set in advance for comparison (comparison code sequence), without decoding the incoming code sequence, to see if the two code sequences agree.

The memory 62 is a RAM that provides working memory space for the module CPU 61 in the satellite wave reception and processing unit 60. Also, the memory 62 temporarily stores the code sequence data that is generated and used to contrast and compare with the incoming code sequence.

The storage unit 63 stores various types of configuration data related to GPS positioning and the history of position measurements. Various types of non-volatile memories such as flash memory or EEPROM (electrically, erasable and programmable read-only memory) are used for the storage unit 63. Data stored in the storage unit 63 includes orbital information (ephemeris), approximate orbital information (almanac), and the date/time of prior measurements as well as the locations of satellites at the time of those measurements. In addition, the storage unit 63 stores, as a time difference table, data about different time zones around the world and whether daylight saving time is in effect. Once the position measurement is taken, the time difference table is used as a reference to determine local time data such as the time difference between the coordinated universal time (UTC) in the standard time obtained at the current location or the data about whether daylight saving time is in effect.

The storage unit 63 stores the programs 631 that are used to execute a position measurement to determine the local time data. The module CPU 61 reads out and executes the program 631.

The RF unit 64 receives satellite waves in L1 frequency (1.57542 GHz for GPS satellites), selectively filters and amplifies the incoming signal from the positioning satellites, and converts the incoming signal to the intermediate frequency. The RF unit 64 includes an LNA (low noise amplifier), a BPF (band pass filter), a local oscillator, a mixer, and the like.

By applying the C/A code of the respective positioning satellites to the intermediate frequency obtained by the RF unit 64, the baseband conversion unit 65 acquires the baseband signal, or in other words the code sequence (incoming code sequence) related to navigation message (prescribed format). The capturing and tracking unit 66 computes respective correlation values of the C/A code of the respective positioning satellites at respective phases with respect to the intermediate frequency signal obtained by the RF unit 64. By determining the peak correlation value, the capturing and tracking unit 66 identifies the signal that is being received from the positioning satellites and the phase of the signal. The capturing and tracking unit 66 also sends feedback about the phase data to the baseband conversion unit 65 in order to continuously acquire the code sequence related to the navigation messages from the positioning satellite by using the C/A code of the identified positioning satellite and the phase of the C/A code.

The wave reception unit is constituted by the RF unit 64, the baseband conversion unit 65, and the capturing and tracking unit 66.

The power source unit 50 supplies power directly to the satellite wave reception and processing unit 60 and is turned ON and OFF by a control signal from the host CPU 41. In other words, the satellite wave reception and processing unit 60 is turned OFF when the unit is not receiving radio waves from the positioning satellites or performing computational operations related to obtaining date/time or determining satellite position, separately from units that are always in operation such as the host CPU 41. Also, it is possible to switch, based on an input operation to the operation unit 49, the satellite wave reception and processing unit 60 according to the present embodiment to go into airplane mode, which is a setting used to control use of radio waves during flight. In airplane mode, the host CPU 41 blocks the satellite wave reception and processing unit 60 from turning ON. Alternatively, in airplane mode, just the radio wave reception operation in the satellite wave reception and processing unit 60 may be blocked.

Now, the format of the navigation message sent from the GPS satellites is described.

GNSS is a system in which a plurality of positioning satellites are distributed in a plurality of orbits. The system enables signals from the plurality of different positioning satellites to be simultaneously received at respective locations on the surface of the earth. By obtaining information about the real-time satellite positions and date/time information that are sent from four or more positioning satellites (only three satellites are needed if an object to be located is assumed to be on the surface of the earth), it becomes possible to determine the coordinate position in three-dimensional space of the satellites and date/time. This determination is based on the acquired data and the error in the timing of data acquisition, or in other words the difference in how long the signal from the respective positioning satellites takes to travel (distance).

The positioning satellites transmit date/time information, satellite location information, and status information such as the health of the satellites. This information is transmitted by a spread spectrum technique using a C/A code (pseudo-random noise). Each satellite navigation system sets its own signal transmission format (navigation message format).

Figure 2:
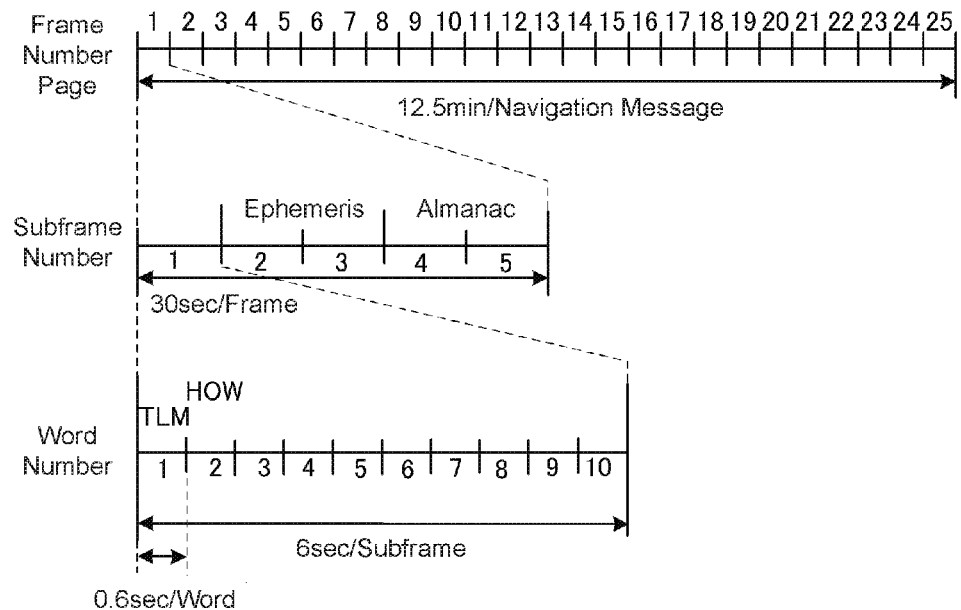
FIG. 2 is a view describing a format of navigation message sent by the GPS satellites.
Figure 2:
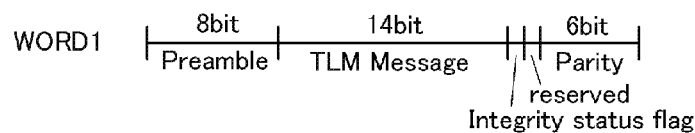
Figure 2:
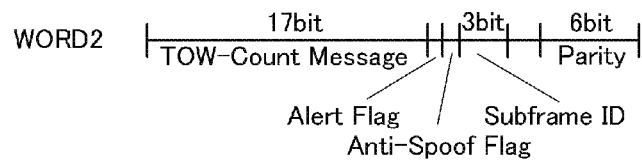
Figure 2:
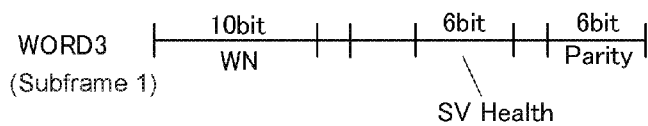

FIG. 2 is a view used to describe the format of navigation message transmitted from the GPS satellites.

In GPS, each of the GPS satellites transmits a total of 25 pages of data frames, each of which is 30-seconds long, and outputs the entire navigation message in a period of 12.5 minutes. In GPS, each of the GPS satellites uses a unique C/A code. A C/A code contains 1023 code bits (chips) and is transmitted at 1.023 MHz with a period of 1 ms. The beginning of the chip sequence is synchronized with the internal clock of the GPS satellites. By detecting a phase shift of each GPS satellite, the signal travel time, or in other words the phase shift that corresponds to the distance between the GPS satellite and the present location (pseudo distance, distance index value), is detected.

Five subframes (6 seconds) constitute each of the data frames. Ten words (each 0.6 seconds long, word 1 to word 10 in that order) constitute each of the subframes. The data format in word 1 and word 2 is the same in all subframes. In word 1, the first 8 bits contains a preamble, which is an invariant code sequence, followed by a 14-bit TLM message. After this, 1-bit integrity status flag, 1-bit reserved bit, and 6-bit parity data are arranged. Word 2 begins with 17-bit TOW-count (also known as Z-count), which indicates the time elapsed since the beginning of the GPS week, followed by alert flag and anti-spoof flag each having 1-bit. Then the subframe ID, which indicates the subframe number (period number), is represented by 3-bits. After this, 2 bits used for matching parity data is arranged followed by 6-bit parity data.

Different subframes contain different data after word 3. Word 3 of subframe 1 begins with the 10-bit WN (week number). Subframes 2 and 3 mainly include the ephemeris (precise satellite orbital information), and part of subframe 4 and subframe 5 transmit the almanac (approximate orbital information).

Next, operations involved in acquiring date/time information in the electronic watch 1 according to the present embodiment are described.

Conventionally, to obtain date/time information, WN of subframe 1 and the TOW count from each of the subframes need to be received, decoded according to the format of the navigation message, and the date/time needs to be computed. However, if the date or the like is already known and figuring out which week the present date/time corresponds to is unnecessary, it becomes possible to determine the date/time by obtaining only the value of the TOW count and timing at which this is synchronized and combining those with already known information. As described above, if the error in date/time counted by the counter circuit 46 (rate) is sufficiently small, it is extremely unlikely that the error becomes greater than one day. Thus, in most cases, the reception of WN can be omitted. In the electronic watch 1 according to the present embodiment, when obtaining date/time information by decoding incoming code sequence, if the time that has elapsed since the last acquisition of date/time information is no greater than a prescribed period, one month, for example, then the reception of the WN can be omitted.

However, to obtain the value of the TOW count, which part of navigation message code sequence is being received needs to be identified. When demodulating the incoming signal, if the TOW count code sequence is not accurately identified, inaccurate date/time would be obtained. Thus, normally, data that guarantee the accuracy of the code sequence are also obtained.

In the electronic watch 1 according to the present embodiment, the module CPU 61 of the satellite wave reception and processing unit 60 generates in advance an expected code sequence, which the unit expects to receive, in a prescribed bit length. The module CPU 61 determines whether the accurate date/time was received by comparing the actually received code sequence with the expected code sequence. The watch is synchronized with the accurate present date/time based on the timing when the match between the expected code sequence and the incoming code sequence is detected (timing of detection). In other words, the accurate date/time information is obtained using the timing of detection of the expected code sequence and the date/time indicated by the expected code sequence.

The expected code sequence includes invariant codes that do not change with transmission period such as a preamble or reserved bits. The expected code sequence also includes a part or whole of code sequences that vary according to changes in date/time, or in other words according to the transmission interval of subframes, such as a TOW count, a subframe ID, or a WN. Code bits that are "0" in normal operation and that are not desirable when "1" such as alert flags or anti-spoof flags are not possible to predict in advance. However, they may be assumed to be "0" and added to the expected code sequence.

Furthermore, a different code sequence can be used as the expected code sequence. Code sequences that were received during the most recent reception or the previous several receptions of satellite waves and the reception date/times (reception history) thereof can be stored in the storage unit 63. Among these stored code sequences, code sequences such as the telemetry message of word 1, for which changes from the previous reception cannot be predicted entirely according to the location of the code within the navigation message, and which can normally be thought to remain the same when the time elapsed from the last reception is short, can be used as the expected code sequence. Alternatively, part or whole of the telemetry message may be combined with the invariant code sequence or the code sequences that change with the transmission period described above to form the expected code sequence. Determining whether a code sequence can be used for the expected code sequence is not based simply on the time elapsed from the previous reception. Additional requirements such as the code that has not changed at all in multiple receptions needing to be used may be included.

Similarly, if data related to the orbit of positioning satellites such as almanac data is obtained and the time until the next update has not yet elapsed, then the orbital data can also be included in the expected code sequence.

In particular, it is preferable to generate an expected code sequence using the date/time counted by the counter circuit 46 such that at least a part of the least significant bit (LSB) side of the TOW count and the subframe ID, which change reflecting the time transmitted at each transmission period (information dealing with time), be included in the expected code sequence. By doing this, a possibility of misidentification due to the difference of one transmission period (one subframe) can be further reduced. If the error is estimated to be so small such that the situation in which a different subframe is received as described above is inconceivable, a timing error in the date/time data of the counter circuit 46 can be adjusted solely on the basis of the detection timing. This error can be estimated based on the percentage of the error in the date/time counted by the counter circuit 46 (rate) and the time elapsed since the time of the previous date/time adjustment, for example. As described above, when the rate of the counter circuit 46 is 0.5 seconds per day, the estimated rate 30 days after the last (most recent) date/time adjustment is 15 seconds.

Parity data arranged at the 25th to 30th bit of each word are computed based on the parity code of the 29th bit and the 30th bit of the previous word and respective necessary bit data out of the 1st to the 24th bit of the same word. Thus, it is difficult to predict the 29th-bit and 30th-bit parity codes of the previous word, and, in the electronic watch according to the present embodiment, these parity data are not included in the expected code sequence.

Code sequences that are compared and identified do not all need to be continuous and can be made of a plurality of different code sequences. However, it is preferable that the entire reception length be shorter than that in a normal short-time reception such as 3-word reception (90 bits), for example. Furthermore, it is preferable that the length be shorter than 60 bits, which the length of (data block length) the sum of the two words, word 1 and word 2, that include the preamble, the TOW count containing information about the present time, and the parity data with respect to the TOW count (error correction code).

Here, when the expected code sequence is compared with the incoming code sequence, the code bits in bits 1 to 24 of the code sequence (code bits other than the parity data) that correspond to the data being actually transmitted by the GPS satellites are inverted for each word according to the parity data code (inversion code) of the last bit (the 30th bit) of the previous word. In other words, if the inversion code is 0, the code bits in bits 1 to 24 of the next word are transmitted unchanged corresponding to the data to be transmitted. In contrast, if the inversion code is 1, the code bits in bits 1 to 24 of the next word become a code sequence in which all of the code sequences that contain the data to be transmitted are inverted. During comparison, one of the following processes is executed: (1) a plurality of code sequences based on the transmitted data that is predicted according to the respective inversion codes, and they are compared respectively; (2) the expected code sequence and the incoming code sequence are tested word by word for a perfect agreement or disagreement, and in case of a perfect disagreement, the inversion code of the word before the word in question is identified, and whether the inversion code is 1 is checked; (3) if the expected code sequence and the incoming code sequence either perfectly agree or disagree, in both cases, it is assumed that the expected code sequence was found in the incoming code sequence.

In case (1), the processing load related to comparison increases. In case (2), the processing needed after the detection of the expected code increases. In case (3), the possibility of misidentification increases. Thus, one of these processes may be chosen appropriately according to the preference of the user, the capability of the electronic watch 1, or the like.

When determining whether the expected code sequence is detected (received), if a code sequence identical to the expected code sequence appears in locations other than the locations where the expected code sequence is expected to appear normally, an incorrect date/time can be obtained. The likelihood of the code sequence identical to the expected code sequence appearing in unexpected locations increases as the expected code sequence becomes shorter. As the expected code sequence becomes longer, the reception time becomes longer. In view of this problem, in the electronic watch 1 according to the present embodiment, the probabilities of occurrence of 0 and 1 in each of the binary code bits are simplified by assuming that the probabilities are the same at ½, respectively. The length of the expected code sequence is set by determining the reference values for the number of and the probability of occurrence of the expected code sequence such that these values are sufficiently small in proportion to the number of times and frequency the electronic watch 1 is expected to receive date/time data within its product cycle.

In other words, because the probability of occurrence of a given N-bit code sequence is $(\frac{1}{2})^N$, it is acceptable if this probability of occurrence is sufficiently small. To keep the probability of occurrence below $10^{-8}$, N needs to be greater than or equal to 27, and to keep the probability of occurrence below $10^{-6}$, N needs to be greater than or equal to 20, for example. Assuming that the product life cycle of the electronic watch 1 is 20 years and six reception operations are executed per day, the expected number of times the watch receives a signal becomes 43830 times. Thus, if N=20, the probability of even one misidentification during the product life cycle is about 4.2%, and if N=27, the probability of misidentification is about 0.033%. The reference value of this probability of occurrence may be set in advance, or the watch may come with the ability to set the standard probability directly or indirectly based on the user input to the operation unit 49 (there may be various reference values corresponding to expressions such as "hard," "normal," or "weak," for example).

Figure 3:
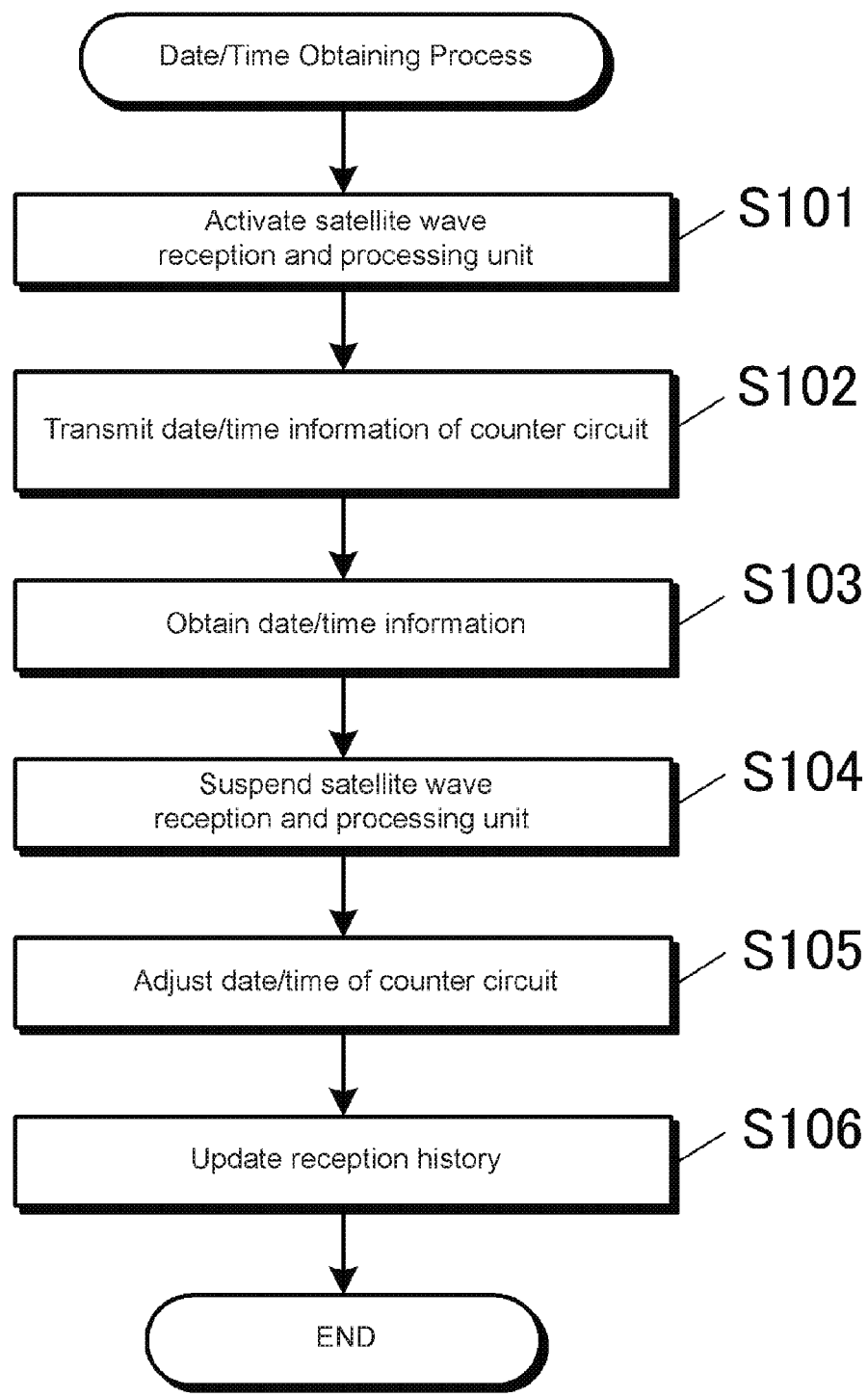
FIG. 3 is a flowchart showing control steps for obtaining and processing date/time.

FIG. 3 is a flowchart showing control steps involved in obtaining and processing date/time by the host CPU 41 in the electronic watch 1 according to the present embodiment. The date/time obtaining process is activated when an input operation of executive instruction to the operation unit 49 by the user is detected or when criteria such as the preset reception time or the reception timing are met.

Once the date/time obtaining process begins, the host CPU 41 activates the satellite wave reception and processing unit 60 (step S101). The host CPU 41 sends to the satellite wave reception and processing unit 60 two pieces of information: one about the setting that indicates that the object of the initial data retrieval is date/time information, and another about the date/time counted by the counter circuit 46 (step S102). Then, the host CPU 41 is put on standby for data output from the satellite wave reception and processing unit 60. During the standby, the host CPU 41 may instruct the display unit 47 to show that the host CPU 41 is receiving data.

After receiving a signal from the satellite wave reception and processing unit 60, the host CPU 41 obtains date/time information (step S103). Then, the host CPU 41 suspends the satellite wave reception and processing unit 60 (step S104) and adjusts the date/time counted by the counter circuit 46 (step S105). The host CPU 41 updates the reception history stored in the RAM 43 (step S106). Then, the host CPU 41 ends the date/time obtaining process.

Figure 4:
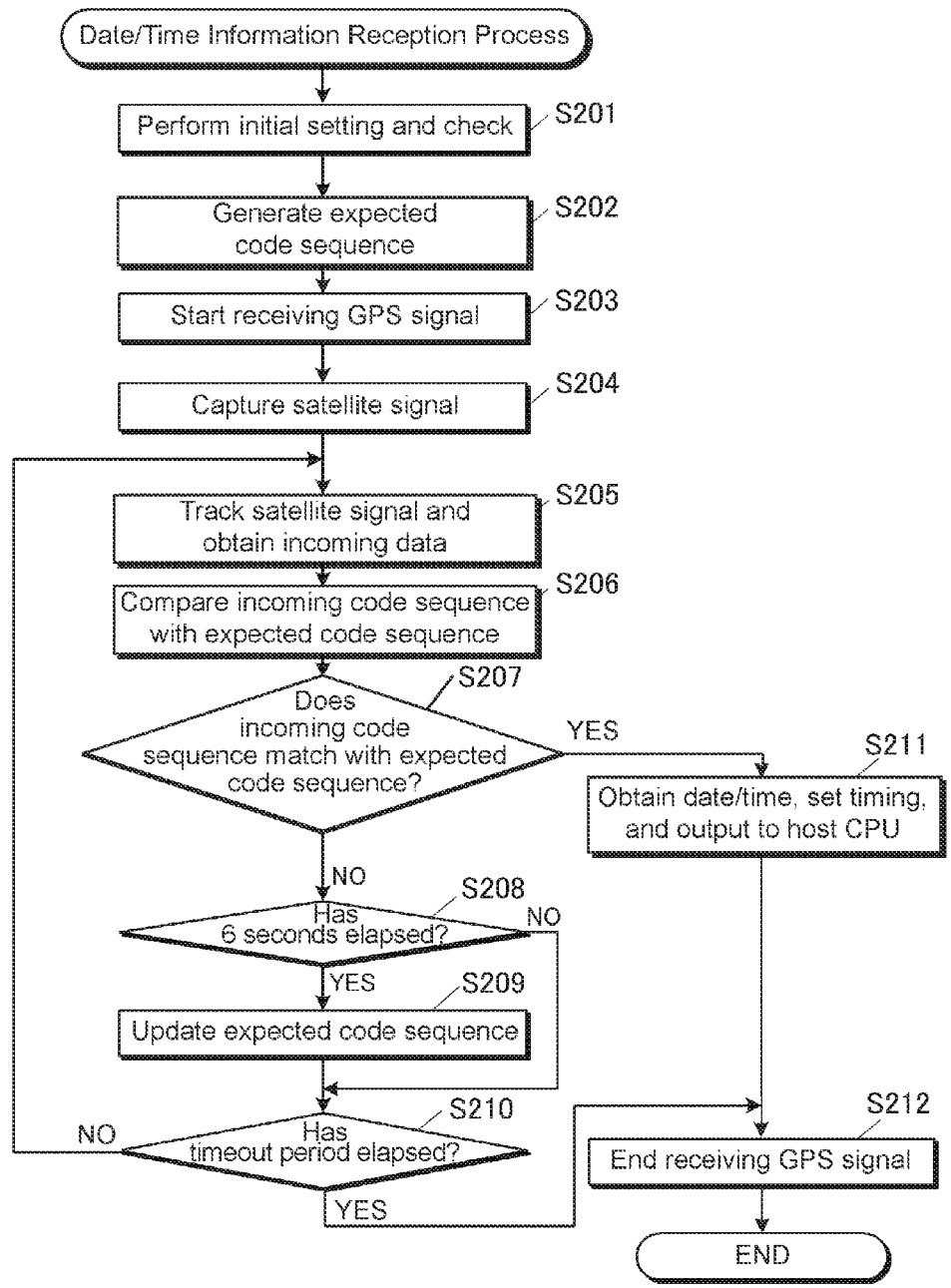
FIG. 4 is a flowchart showing control steps for receiving and processing date/time information.

FIG. 4 is a flowchart showing control steps involved in the date/time information reception process by the module CPU 61 in the electronic watch 1 according to the present embodiment. The date/time information reception process is activated when the host CPU 41 activates the satellite wave reception and processing unit 60 and the data outputted from the host CPU 41 in the processing involved in step S102 is date/time information.

Once the date/time information reception process is activated, the module CPU 61 conducts an initial setting and an operation check. The module CPU 61 obtains the date/time information outputted from the host CPU 41 in the processing involved in step S102 and then determines the contents of the navigation message to be received and the start timing and the duration of the reception of the determined content (step S201).

The module CPU 61 generates the expected code sequence for the part of the code sequence that needs to be identified during the set reception period (step S202). When it is possible to change the length and location of the expected code sequence, the module CPU 61 obtains from the storage unit 63 the setting relevant to the change and generates an appropriate expected code sequence. The module CPU 61 begins to receive waves from the GPS satellite at an appropriate timing (step S203) and captures the waves from the GPS satellites that are possible to capture (step S204). The module CPU 61 attempts to use the reverse spread spectrum technique by applying the C/A code of the respective GPS satellites to the signal obtained from the received waves while shifting the phase of the C/A code and to detect and capture the signal from the GPS satellites.

Once the signal from a GPS satellite is captured, the module CPU 61 obtains the code sequence of the incoming data (incoming code sequence) while tracking the GPS satellite (step S205). The module CPU 61 compares the prescribed bit length that corresponds to the array width of the expected code sequence in the incoming data with the generated expected code sequence (step S206). The module CPU 61 determines whether a perfect agreement between parts of the incoming data and the expected code sequence was detected (step S207). If no perfect agreement is detected ("NO" in step S207), the module CPU 61 determines whether 6 seconds (the transmission interval of one subframe) or longer has elapsed since the comparison with the expected code sequence began. In other words, the module CPU 61 determines whether the beginning of the portion of the incoming code sequence that has a fixed bit length and is supposed to be compared with the expected code sequence has shifted by 6 seconds or longer (step S208). When it is determined that 6 seconds has not elapsed ("NO" in step S208), the processing sequence of the module CPU 61 moves onto step S210.

If it is determined that 6 seconds or longer has elapsed ("YES" in step S208), the module CPU 61 generates an expected code sequence that corresponds to the next subframe (in other words, an expected code sequence generated based on the time after the transmission period of the previous subframe) and updates the old expected code sequence (step S209). Then the process of the module CPU 61 moves onto step S210.

Once in the process in step S210, the module CPU 61 determines whether the time elapsed since starting the reception is longer than a timeout period (step S210). The timeout period may be set to the time that corresponds to a predetermined number of subframes or the like and changed appropriately according to the battery capacity at the start of the reception or the elapsed time since the last reception. If it is determined that the timeout period has not elapsed ("NO" in step S210), the process in the module CPU 61 goes back to step S205, and the module CPU 61, while continuing to obtain the incoming data, shifts the range of the code sequence that has the prescribed bit length and is supposed to be compared with the expected code sequence in step S206 according to newly obtained received data. If it is determined that the timeout period has elapsed ("YES" in step S210), the processing sequence of the module CPU 61 moves on to step S212.

If the determination process in step S207 determines that a perfect agreement between parts of the incoming data and the expected code sequence is detected ("YES" in step S207), the module CPU 61 obtains the date/time that corresponds to the matched expected code sequence and outputs to the host CPU 41 this obtained date/time information in synchronization with the start timing of the date/time (in other words, the timing at which the next subframe begins) (step S211).

Once moved on to the process in step S212, the module CPU 61 stops the satellite wave reception and processing unit 60 (step S212). Then, the module CPU 61 ends the date/time obtaining process.

Figure 5:
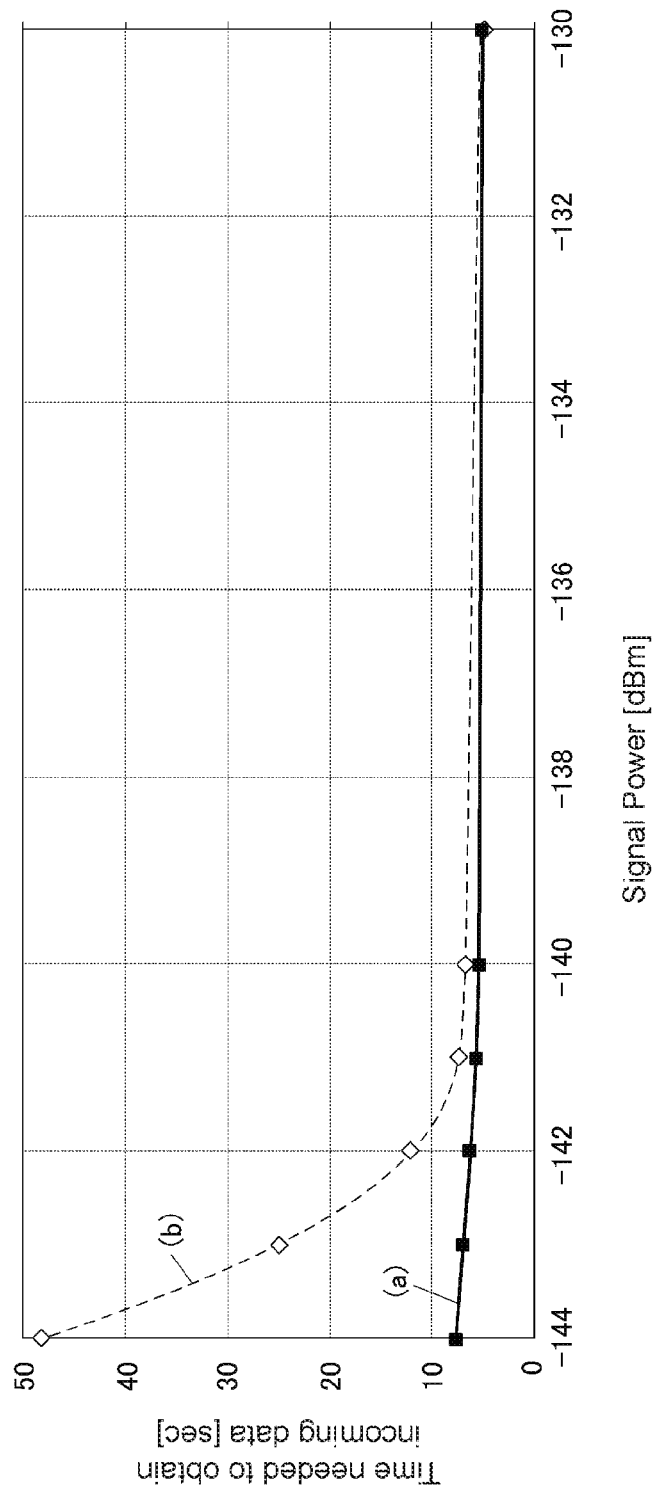
FIG. 5 is a view showing the result of a comparison between the data reception time required by an electronic watch according to Embodiment 1 and the data reception time required by a conventional three-word reception.

FIG. 5 is a view showing the result of a comparison between the data reception (tracking) time required by the electronic watch 1 according to the present embodiment when detecting perfect agreement of a 28-bit code and the data reception time required by a conventional three-word reception method (including parity verification). The horizontal axis represents the wave strength (power dBm) of an input signal from the GPS satellites, and the vertical axis shows the time (sec) needed to obtain the necessary data. Here, the data reception time related to the conventional three-word reception method involves a case in which an error is detected when checking for parity for three words, word 1 to 3, and it is decided to continue to receive data for 6 more seconds until word 1 to 3 of the next subframe is received. The data reception time related to the conventional three-word reception indicates the time actually measured from when the waves from the GPS satellites are captured to when the tracking of the captured waves from the GPS satellites ends. The data reception time taken by the reception method according to the present embodiment is based on the assumption that an error occurs in some random code location with the same error rate that occurs when identifying a code related to the actual measurement. In addition to this assumption, if an error occurs in identifying a code in the expected code sequence and a perfect agreement is not detected, it is also assumed that the data reception is continued for 6 more seconds until the code sequence in the next subframe in the identical location is transmitted. The data reception time is estimated on the basis of these assumptions.

As shown by the dotted line (b), in the conventional reception method, when the power of the waves of the input signal strength is below −140 dBm, as the signal strength decreases down to −144 dBm, the time required for data reception increases up to about several times longer. In contrast, the data reception time in the electronic watch 1 according to the present embodiment shown with the solid line (a) does not increase much (within about a few dozen percent), even when the signal strength falls to about −144 dBm, and accurate date/time information is obtained quickly.

As described above, the electronic watch 1 according to Embodiment 1 includes the RF unit 64, the baseband conversion unit 65, and the capturing and tracking unit 66, each of which are part of the satellite wave reception and processing unit 60 that receives satellite waves from the positioning satellites and extracts the incoming code sequence formatted in a prescribed format from the satellite waves, as well as the module CPU 61. The module CPU 61, functioning as the expected code sequence generation unit 611, generates an expected code sequence that is expected to be part of the incoming code sequence within the incoming code sequence by sequentially comparing the generated expected code sequence with the incoming code sequence sequentially to detect the expected code sequence within the incoming code sequence. The module CPU 61 functions as the date/time acquisition unit 613 determines the present date/time in accordance with the timing of the detection. Here, the expected code sequence includes codes that can change with a subframe period during which information related to time such as the TOW count and the subframe ID that contain information about the present time, which are formatted in the navigation message format and transmitted from the positioning satellite, which is the data source.

In this way, unlike the situation in which parity bits are used, unnecessary bit data do not need to be verified. Because the verification of the target bit data used for comparison is the only thing needed to obtain accurate date/time information, accurate date/time information can be obtained more efficiently.

Also, generating an expected code sequence before and during the reception of satellite waves and comparing the expected code with the incoming code sequence make unnecessary the decoding of the incoming code sequence. Thus, after the expected code sequence is detected in the incoming code sequence, date/time can be obtained swiftly.

In particular, the chance of needing to re-receive the data when the reception condition is bad can be reduced. Thus, the rate of increase in reception time under unfavorable reception condition can be reduced. Furthermore, the increase in power consumption used for reception can be curtailed.

The watch is equipped with the counter circuit 46 that counts date/time, and the module CPU 61 functioning as the date/time acquisition unit 613 can adjust the date/time by merely obtaining the timing error in the date/time counted by the counter circuit 46 when the expected code sequence is detected in the incoming code sequence. Thus, the process involved in a situation in which an error in units of subframes is not expected can be simplified, and the date/time can obtained more easily and efficiently.

The watch is equipped with the counter circuit 46. Based on the time/date counted by the counter circuit 46, the module CPU 61 functioning as the expected code sequence generation unit 611 generates an expected code sequence that includes at least a prescribed number of low-order bits that are part of code segments such as the TOW count or the subframe ID that indicate information related to time. The module CPU 61 functioning as the date/time acquisition unit 613 obtains the current date/time by combining the date/time counted by the counter circuit 46 and the timing when the expected code sequence is detected in the incoming code sequence. Thus, concerns about misidentifying a code sequence because of an error in units of subframes can be reduced.

Because the number of bits in the TOW count and the subframe ID is greater than the number of bits in the invariant code sequence, use of the expected code sequence reduces concerns about misidentification and increases accuracy.

When a period corresponding to one subframe (6 seconds) elapses without the expected code sequence being detected in the incoming code sequence, the module CPU 61 functioning as the expected code sequence generation unit 611 renews the expected code sequence based on information related to time contained in the subframe subsequent to the subframe mentioned above. Thus, even when the detection fails due to conditions such as weak reception signal or the presence of too much noise, the detection of the expected code sequence can be easily attempted in the subsequent subframe.

Information related to time included in an expected code sequence includes a value that corresponds to the subframe ID, which is a period number that indicates the number of the transmission period. In other words, it is possible to presume values that change with time, not just for the TOW count but for the subframe ID as well. Thus, the subframe ID can be used in the expected code sequence with the same effect as the TOW count, depending on the number of bits used in the expected code sequence. By simultaneously using TOW count and the subframe ID in the expected code sequence, the occurrence of misidentification can be curtailed more effectively. Also, a long expected code sequence can be generated effectively and proportionally to the increase in the number of received bits, because the subframe ID is located in word 2 next to the TOW count.

The length of the expected code sequence is determined such that the probability of the expected code sequence appearing in a place other than the normally expected place within the incoming code sequence is below a predetermined reference value. Thus, the possibility of a short expected code sequence appearing in a place other than the normally expected place within the incoming code sequence, which causes a misidentification, can be reduced to a necessary level.

In particular, the probability of occurrence of the expected code sequence in an unexpected place is calculated assuming that the occurrence probabilities of 0 and 1 in each of the binary bits that form the incoming code sequence are ½, respectively. Thus, it is possible to set the length of the expected code sequence with ease and based on a calculation criterion that does not deviate too much from the actual probability.

The reference value is determined based on the number of times the wave reception unit is expected to receive satellite waves. A strict criterion value can be set for a radio-controlled timepiece that is used frequently and for extended periods of time, and a soft criterion can be set for a radio-controlled timepiece that is used less frequently and for short periods of time. In either case, the number of misidentifications can be kept within a range that does not cause serious problems, and date/time can be obtained most efficiently.

Also, the electronic watch is equipped with the operation unit 49 that receives the user operation, and the reference value can be set according to the setting input to the operation unit. Thus, depending on the wishes of the user, the frequency and number of misidentifications and the time needed to receive satellite waves can be balanced appropriately according to usage conditions or the like.

The length of the incoming code sequence is set shorter than the length of the data block that includes the preamble, the TOW count, and the parity data for the TOW count. Thus, the shortest reception time, within which no problems with the status of radio wave reception and repeated reception occur, can be made shorter than that for a standard 2-word reception.

The module CPU 61 functioning as the expected code sequence generation unit 611 generates the expected code sequence that corresponds to a plurality of different code sequence segments in the incoming code sequence. Thus, even if there are codes in the middle of the incoming code sequence that are difficult to predict, those can be skipped, and an expected code sequence that has an appropriate length as a whole can be generated.

The module CPU 61 functioning as the expected code sequence generation unit 611 generates an expected code sequence that includes the preamble that is contained in each transmission period that corresponds to the satellite waves to be received, or in other words the preamble that in contained within a subframe in the case of GPS satellites. A high-precision timing detection can be carried out reliably and efficiently by combining the preamble, which is an invariant code sequence, with the code sequences that change at each transmission period.

A unit block consists of bits 1 to 24 of each word. The transmitted code sequence embedded in the navigation message that carries the information content transmitted from the GPS satellites transmitting satellite waves includes an inversion code that determines, with respect to each unit block, whether to invert each code bit in the unit block before transmission. The module CPU 61 functioning as the expected code sequence generation unit 611 generates both an expected code sequence that includes a code sequence in which code bits in each unit block within the expected code sequence are inverted and another expected code sequence that includes a code sequence in which respective code bits are not inverted. The module CPU 61 functioning as a comparison unit 612 compares each of the generated expected code sequences with the incoming code sequence.

In this way, the expected code sequence can be easily detected from the incoming code sequence regardless of whether the code bits in each unit block were actually inverted.

Also, the module CPU 61 functioning as the expected code sequence generation unit 611 generates an expected code sequence that includes at least one specific flag related to the transmission status such as alert flag, anti-spoof flag, or integrity status flag. These code bits are not necessarily predictable. However, generating the expected code sequence on the assumption that these code bits are unproblematic avoids unintentionally receiving date/time from corrupted incoming data. Also, under normal circumstances, increasing the number of bits in the expected code sequence improves the accuracy. In particular, because alert flag and anti-spoof flag are arranged between the TOW count and the subframe ID, the relative number of bits can be increased without increasing reception time. By virtue of this fact, the date/time information can be obtained while efficiently improving the reception accuracy.

Also, the electronic watch has the storage unit 63 and uses the storage unit 63 as the history storage unit 632, which stores the reception history of the most recent satellite waves, and as the array storage unit 633, which stores the code sequence obtained during the reception of the most recent satellite waves. The module CPU 61 functioning as the expected code sequence generation unit 611 determines which parts of the code sequence stored in the storage unit 63 functioning as the array storage unit 633 do not change within the time elapsed since the reception of the most recent satellite waves. This determination is based on the type of data related to the code sequence, and at least a part of the selected code sequence is included in the expected code sequence. In other words, a code sequence such as the telemetry message, which is not necessarily predictable but does not change significantly under normal circumstances, can be stored and used for the expected code sequence when the elapsed time from the reception of the last satellite waves is short. In this way, the detection accuracy can be improved without increasing the chance of creating problems in detecting the expected code sequence in the incoming code sequence.

By using the method of obtaining date/time information described above, the date/time information can be obtained efficiently even in the situation in which the date/time information is obtained using a plurality of CPUs or radio wave reception devices. Thus, the reception time can be shortened, and the accuracy of date/time acquisition can be improved in a balanced way that takes into account the capability of the CPUs and the radio wave reception devices, the preference of the user, and the like.

The module CPU 61 (processor) of a computer (the satellite wave reception and processing unit 60), which is equipped with a wave reception unit that receives satellite waves and identifies an incoming code sequence in a prescribed format that corresponds to the received satellite waves, can be programmed to carry out the control steps involved in the reception and processing of date/time information for acquiring date/time, as described above. Using the module CPU and these programs, various types of computer terminals capable of receiving radio waves from the positioning satellites can be used to efficiently obtain date/time information in accordance with the use and capabilities of the computer terminals.

Embodiment 2

Next, an electronic watch according to Embodiment 2 of the present invention is described.

The configuration of an electronic watch 1 according to Embodiment 2 is the same as the configuration of the electronic watch 1 according to Embodiment 1. Thus, the same reference characters are used, and the description thereof is omitted.

Next, the operations involved in obtaining date/time information in the electronic watch 1 according to Embodiment 2 are described.

When comparing the incoming code sequence with the expected code sequence, the electronic watch 1 according to the present embodiment adjusts the criteria and timing of the comparison to prevent a wrong transmission period (subframe) from being used for comparison. Other operations are identical to those in the electronic watch 1 according to Embodiment 1, and the detailed description of the identical operations thereof is omitted.

As described above, a counting error within ±0.5 seconds per day occurs in a counter circuit 46 depending on temperature and operation conditions. As time passes from the most recent timing when the date/time counted by the counter circuit 46 was adjusted, the maximum error in the date/time counted by the counter circuit 46 continues to increase. Thus, the chance that the expected sequence and the incoming code sequence belong to different transmission periods (subframes) increases. The electronic watch 1 according to the present embodiment is set to begin reception at a specific timing. The timing is set such that the period during which a code sequence that necessarily agrees with the expected code sequence is transmitted falls within the 6-seconds window measured from when the watch starts comparing the incoming code sequence and the expected code sequence. The timing of the last date/time adjustment can be stored in the storage unit 63 in advance. At the start of the date/time operation, the module CPU 61 can determine whether at least 6 days have elapsed since the last date/time adjustment. In other words, the criterion is whether the maximum absolute value of the estimated error is equal to or greater than 3 seconds with a total of 6 seconds or longer, whether it is longer than half the length of a subframe (transmission period), which is a benchmark time set according to the transmission period (i.e., whether the total sum is longer than the length of a subframe). If the elapsed time is longer than the benchmark time, it is switched to other methods of obtaining date/time. In that case, a conventional 3-word reception is performed, the code sequence related to the navigation message is decoded, and the date/time is obtained, for example.

Figure 6A:
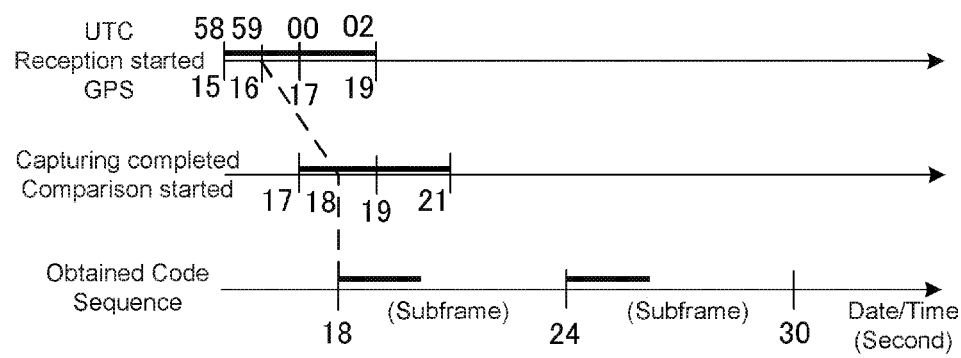
FIGS. 6A and 6B are views describing a setting for the timing for starting data reception.
Figure 6B:
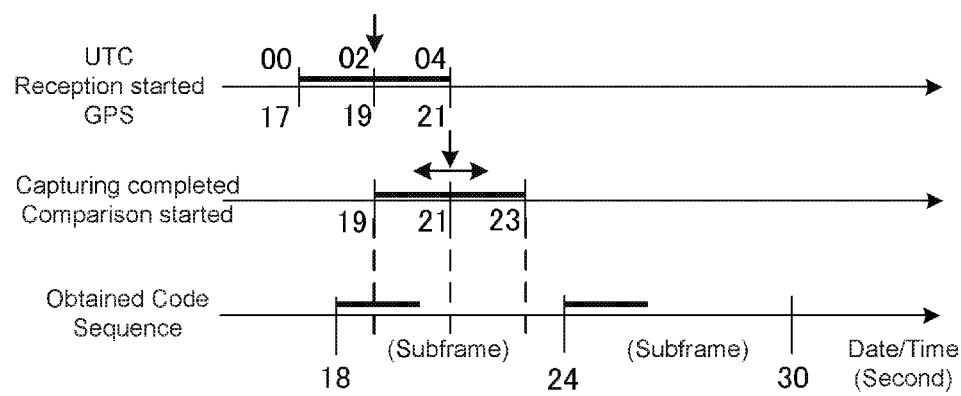

FIGS. 6A and 6B are views used to describe the setting for when to start receiving data.

Here, an example in which the error of date/time counted by the counter circuit 46 is estimated to be at most 2 seconds is used for description.

As shown in FIG. 6A, when the reception begins at second 00 of a given hour and minute in the date/time (UTC) measured by the counter circuit 46, the moment at which the reception begins corresponds to second 58 or later of the previous minute in accurate timing or any moment within 2 seconds of second 00 in the same hour and minute kept by the counter circuit 46 (the thick horizontal line in the upper row). Due to the use of leap seconds (the description here assumes that the difference is +17 seconds), there is a gap between the date/time transmitted from the GPS satellites (GPS date/time) and UTC date/time. Thus, expressed in GPS date/time, the period during which the reception can begin is between second 15 and second 19 of the same minute measured by the counter circuit 46. If it takes 2 seconds to capture the waves from the GPS satellites, the moment at which it becomes possible to identify and obtain a code sequence after completing the capturing operation, in other words the earliest moment at which the beginning of the incoming code sequence can be compared with the expected code sequence (referred to as the timing for starting comparison), is second 17 or later but before second 21 of the same minute (see the thick horizontal line in the middle row).

The transmission of each subframe data transmitted from the GPS satellites begins at second 0 of every minute in GPS time with a period of 6 seconds. Suppose that the expected code sequence is set as having the prescribed number of bits starting from the beginning (preamble) of each subframe (28 bits that include the preamble, the TOW count, and the subframe ID) and that the accurate time for starting reception (UTC) is between second 58 and second 59. In that case, the incoming code sequence (the thick horizontal line on the left in the lower row) that belongs to the subframe including the preamble that begins to be received at second 18 in GPS time is compared with the expected code sequence. On the other hand, if the accurate time for starting reception (UTC) is between second 59 to second 2, the incoming code sequence (the thick horizontal line on the left in the lower row), which is the subframe including the preamble that begins to be received at second 24 in GPS time, is compared with the expected code sequence. As a result, if the time for starting reception falls in this range, the values of the TOW count and the subframe ID in the expected code sequence and the incoming code sequence differ, and the expected code sequence and the incoming code sequence will not match perfectly.

In the electronic watch 1 according to the present embodiment, the timing for starting reception and the timing for starting comparison are set so that a code sequence that belongs to the same subframe as the expected code sequence is necessarily identified, obtained, and compared regardless of the error in the counter circuit 46. As shown in FIG. 6B, by setting the timing for starting reception at second 2 in UTC date/time kept by the counter circuit 46 (the downward arrow in the upper row), the timing for starting comparison becomes between second 19 and second 23 in the GPS date/time (thick horizontal line in the middle row), for example. As a result, the part of the incoming code sequence that is compared with the expected code sequence necessarily becomes the subframe including the preamble that begins to be received at second 24 (thick horizontal line on the right in the lower row). Thus, by generating a code sequence that is expected to be transmitted in the subframe beginning at second 24 as the expected code sequence, the expected code sequence and the incoming code sequence can be compared appropriately regardless of the error in the counter circuit 46.

Here, the center time (center date) of the timing for starting comparison that satisfies these conditions can be set within the 2-second interval between second 20 and second 22 (horizontal arrow in the middle row in FIG. 6B). Suppose that the estimated error in time in the electronic watch 1 is within ±3 seconds (the overall error length is 6 seconds). In this case, by starting a comparison at an arbitrary timing within ±3 seconds (−3 seconds of estimated error in time) with respect to the beginning of a predetermined subframe (the period during which the comparison can be started), the incoming code sequence and the expected code sequence related to the same subframe can be compared regardless of the magnitude of the estimated error in time. The moment that is 3 seconds before the beginning of a subframe (−3 seconds of estimated error in time) corresponds to the moment immediately after the last moment according to the error in the date/time of the counter circuit 46 when the incoming code sequence and the expected code sequence that are related to the previous subframe are compared, and the moment that is 3 seconds after the beginning of a subframe (+3 seconds of estimated error in time) corresponds to the earliest moment according to the error in the date/time of the counter circuit 46 when the incoming code sequence and the expected code sequence related to the subsequent subframe are compared The timing for beginning comparison may be set arbitrarily each time within the period during which the comparison can be started. The timing may be fixed to a predetermined moment such as the beginning of the period during which the comparison can be started (here second 20) or the center time (second 21 shown with the downward arrow in the middle row in FIG. 6B), for example.

The date/time for starting reception is determined by taking into account the time needed for capturing the signal with respect to this timing for starting comparison and calculating backwards therefrom. Here, the reception begins 2 seconds, which is how long it takes to capture the signal, before the time for starting reception. In other words, the reception begins at an arbitrary timing (the reception starting period) after second 1 and before second 3 in UTC time measured by the counter circuit 46 (second 1, which corresponds to the beginning of the reception starting period, or second 2, which is the central time). When the capturing of waves from the GPS satellites is completed in less time than the time estimated to be required for the capturing, a standby time can be set between the moment when the capturing of the waves and the identification of a code sequence begin and the moment when the comparison begins. By setting the reception start timing toward the beginning of the reception start period, even if the actual time required for capturing a signal is longer than the estimated time for capturing a signal, the chance of starting comparison as originally scheduled increases. At the same time, even when the reception status is favorable, the reception time becomes longer, thereby increasing the amount of power consumption. Thus, the reception start timing can be set initially at the center time of the reception start period and be shifted forward or backward depending on the reception history and the like, for example. Also, setting the reception start timing at the center time of the reception start period ensures that the reception start timing falls within the period during which the reception can be started, even if the timing at which the capturing of a signal is completed is slightly early or late. In this case, there are normally no problems even if the comparison is started without determining whether the timing falls within the period during which the reception can be started.

Figure 7:
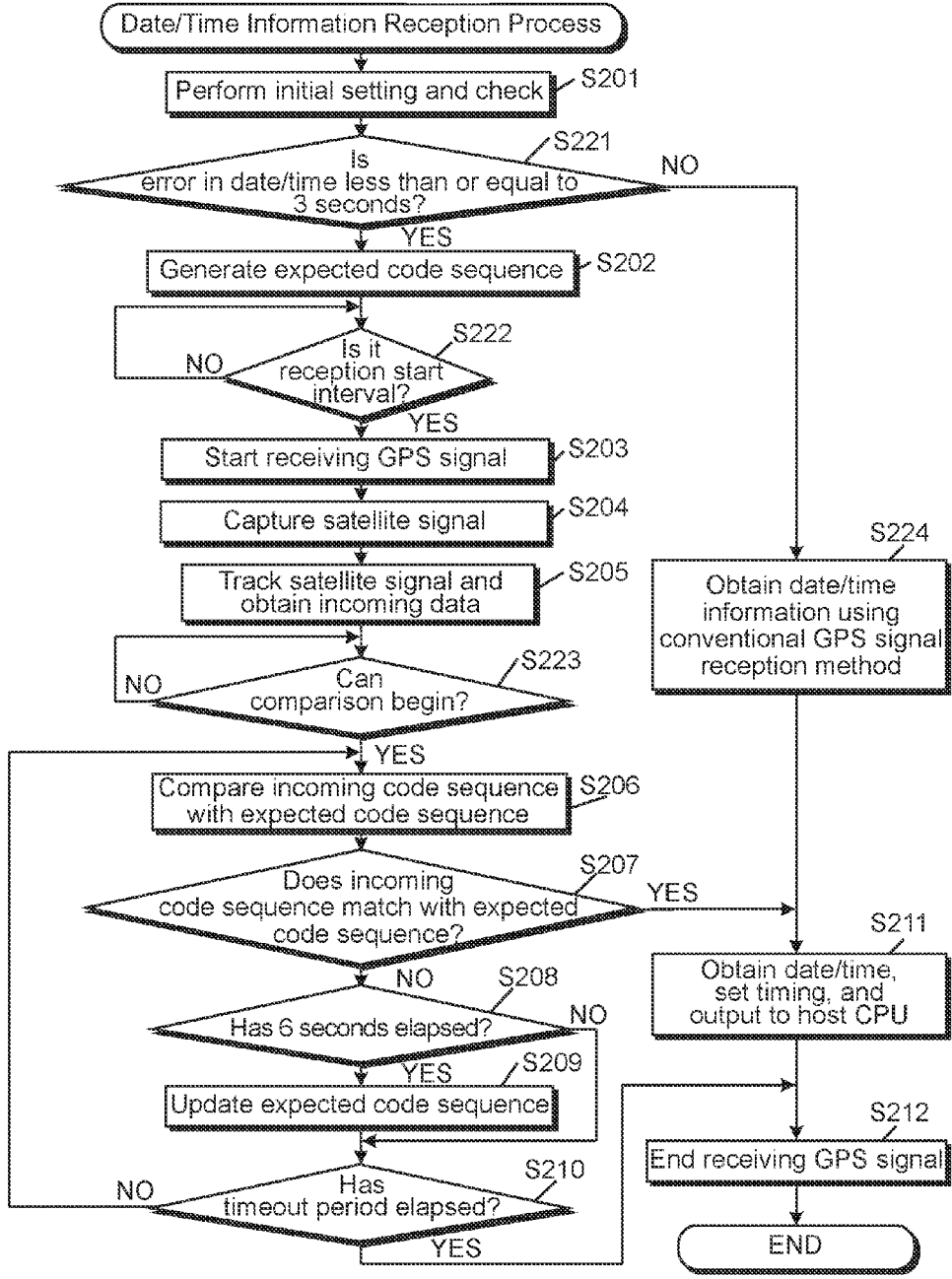
FIG. 7 is a flowchart showing control steps in receiving and processing of date/time information executed by an electronic watch according to Embodiment 2.

FIG. 7 is a flowchart showing control steps executed by the electronic watch 1 according to Embodiment 2 in receiving and processing the date/time information.

The operations executed by the electronic watch 1 according to the present embodiment are the same as the date/time information reception process executed by the electronic watch 1 according to Embodiment 1, except that the processes involved in steps S221 to S224 are added to the date/time information reception process executed by the electronic watch 1 according to Embodiment 1. The same reference characters are used for the same processes, and the descriptions thereof are omitted.

Once the date/time information reception process begins, in the process involved in step S201, the module CPU 61 obtains the date/time counted by the counter circuit 46 and the last reception timing from the storage unit 63. Based on these pieces of information, the module CPU 61 computes the maximum error that is expected based on the time elapsed since the date/time of the counter circuit 46 was adjusted (step S201).

The module CPU 61 determines whether the error is smaller than ±3 seconds (step S221). When it is determined that the maximum error is not smaller than ±3 seconds ("NO" in step S221), the process in the module CPU 61 moves onto step S224, and the date/time information is obtained by decoding the code sequence using conventional methods such as the 3-word reception from the GPS satellites (step S224). Then, the process in the module CPU 61 moves onto step S211.

When it is determined that the maximum error is smaller than ±3 seconds ("YES" in step S221), the module CPU 61 specifies the subframe that can be ensured to be compared first when the reception is started after the current date/time regardless of the error in time. Then, the module CPU 61 generates an expected code sequence for that subframe (step S202).

The module CPU 61 takes into account the time it takes to capture the signal, which is set in advance, and specifies the reception start period. In the reception start period, a code sequence of the subframe specified above can be obtained from the beginning regardless of the error in time. In this way, the module CPU 61 determines whether the current date/time falls within the reception start period (step S222). When it is determined that the current date/time does not fall within the reception start period ("NO" in step S222), then the module CPU 61 repeats the determination process in step S222.

When it is determined that the current date/time falls within the reception start period ("YES" in step S222), then the process in the module CPU 61 moves on to step S203.

After moving onto the process in step S205 and starting to obtain the incoming data (the incoming code sequence), the module CPU 61 determines whether the current date/time falls within the period during which a comparison can be started (step S223). When it is determined that the current date/time does not fall within the period during which a comparison can be started ("NO" in step S223), then the module CPU 61 repeats the process in step S223. When it is determined that the current date/time falls within the period during which a comparison can be started ("YES" in step S223), then the process in the module CPU 61 moves on to step S206.

In step S208, the module CPU 61 determines whether 6 seconds or longer have elapsed since the comparison with the expected code sequence has started. In other words, the module CPU 61 determines whether the beginning of a code sequence of a prescribed bit length chosen out of the incoming code sequence to be compared has shifted 6 seconds or longer from the moment when the comparison has started.

As described above, in the electronic watch 1 according to Embodiment 2, the module CPU 61 functioning as a comparison unit 612 starts to compare the incoming code sequence and the expected code sequence. The comparison starts before the moment when the expected code sequence predicted on the basis of the date/time counted by the counter circuit 46 is detected and within one subframe period from the detection timing described above.

Thus, this method of comparison avoids the situation in which a match with the expected code sequence is not detected due to the expected code sequence being compared with a portion of the code sequence that corresponds to the expected code sequence that belongs to a subframe differing from the subframe to which the expected code sequence belongs.

The module CPU 61 functioning as an error range calculation unit 616 estimates the error range in the counter circuit 46 based on the time elapsed since the most recent timing at which the watch received the satellite waves and adjusted the date/time counted by the counter circuit 46. Taking this error range into account, the module CPU 61 functioning as the comparison unit 612 estimates the range of timing when the detection of the expected code sequence can be started. Based on this range, the module CPU 61 functioning as the comparison unit 612 starts to compare the incoming code sequence and the expected code sequence within the period during which the comparison can be started.

As long as the error range in the counter circuit 46 is within ±3 seconds, the expected code sequence is compared necessarily with a portion of the incoming code sequence that corresponds to the expected code sequence and belongs to the same subframe to which the expected code sequences belongs. This method reliably avoids, regardless of the error range, the situation in which it is impossible to detect perfectly matching parts, which is a situation resulting from the module CPU 61 comparing an incoming code sequence and an expected code sequence that belongs to different subframes.

The timing at which an RF unit 64, a baseband conversion unit 65, and a capturing and tracking unit 66 of the satellite wave reception and processing unit 60 start receiving the satellite waves is determined based on the period during which the comparison can be started. Starting the radio wave reception appropriately based on the period during which the comparison can be made prevents the radio wave reception time from unnecessarily getting longer and controls the power consumption appropriately.

The RF unit 64, the baseband conversion unit 65, and the capturing and tracking unit 66 of the satellite wave reception and processing unit 60 starts receiving the satellite waves at a predetermined time that is earlier than when the module CPU 61 starts comparing the incoming code sequence with the expected code sequence. In other words, the electronic watch 1 reduces the power consumption easily and appropriately and efficiently obtains date/time information by determining the timing of start of comparing the expected code sequence with the incoming code sequence and the timing of starting to receive the satellite waves based on the detection timing of the predicted expected code sequence. In particular, remarkably efficient acquisition of date/time information becomes possible if it can be predicted that the time needed to capture the satellite waves is generally uniform for reasons such as the environment in which the satellite waves are received does not change significantly each time.

The module CPU 61 functioning as an error judgment unit 614 determines whether the error in the counter circuit 46 that is estimated based on the time elapsed from the last time when the satellite waves were received and the date/time of the counter circuit 46 was adjusted is greater than the reference time set according to the length of a subframe. If the module CPU 61 functioning as a date/time acquisition unit 613 determines that the error is not greater than the reference time, the module CPU 61 obtains date/time based on the expected code sequence that includes a prescribed number of low-order bits of time-relevant information such as the TOW count and the subframe ID.

In other words, when there is a chance that an error in units of subframes can occur due to a large error in the counter circuit 46, the chance that detecting the expected code sequence from the incoming code sequence takes a long time or is not possible increases. By detecting the expected code sequence from the incoming code sequence after verifying that there is no such possibility, the module CPU 61 can instruct the satellite wave reception and processing unit to obtain date/time information in a more appropriate and efficient manner.

The present invention is not limited to the embodiments described above, and a various types of modifications are possible.

Although the module CPU 61 functioning as the control unit 615 conducted all the processing operations in the embodiments described above, a part or whole of the processing operations may be conducted by the host CPU 41. The module CPU 61 and the host CPU 41 may be used jointly by a single CPU. To store the previous (most recent) reception history, the storage unit 63 and a RAM 43 may be used jointly.

The module CPU 61 may compare the expected code sequence and the incoming code sequence by shifting one by one the code bit that is obtained when each single bit is obtained. Alternatively, the module CPU 61 may first obtain incoming data of a prescribed bit length longer than the expected code sequence and then compare with the expected code sequence all at once while shifting the phases thereof. In the former case, when ending the comparison as soon as the expected code sequence is identified from the incoming code sequence, if there is a misidentification, the process of comparison ends. However, a code sequence identical to the expected code sequence appearing in the reception location before the location where the code is conventionally expected to appear does not cause problems. In the latter case, regardless of whether the conventionally expected location moves forward or back, if a code sequence that is identical to the expected code sequence appears at a location other than the expected location within the incoming data, a process for identifying the correct location is required. However, in the latter case, misidentification can be avoided effectively.

In the embodiments described above, although the acquisition of date/time information in one aspect of the present invention is performed when the date/time of the counter circuit 46 is adjusted, it may be that all that is wanted is simply to obtain date/time at a prescribed moment (when the user performs an input operation, for example). When date/time related to the expected code sequence is needed, the user may perform an input operation, or the date/time may be obtained from other external devices.

In the embodiments described above, whether to obtain the date/time information related to the present invention was determined according to the estimated error in the counter circuit 46. However, if the magnitude of the error can be accurately estimated, the module CPU may generate the expected code sequence based on the date/time that reflects the magnitude of the error, compare with the incoming code sequence, and obtain date/time information.

Also, the embodiments above described a case in which a comparison is conducted with respect to the reception waves from the GPS satellites. However, the comparison may be conducted with respect to the code sequences related to the incoming waves from other positioning satellites like the GLONASS satellites, for example. In this case, the transmission time of a string (2 seconds) may be taken as the transmission period, and the string number may be used as time-relevant information.

In the embodiments described above, the probability of occurrence of the expected code sequence in an unexpected location was computed assuming that the probabilities of occurrence of 0 and 1 in each code location are ½, respectively. However, with respect to the parts of the code sequence for which the probability of occurrence is clearly different from ½ such as the invariant code sequence or the most significant bits in the TOW, the probability of occurrence for those parts may be set separately and calculated.

The product life cycle and the frequency of radio wave reception per day of the electronic watch 1 shown in the embodiments described above are set arbitrarily. These setting may be decided in advance depending on products or suitably changeable by the user operation. Thus, depending on these factors, the number of bits used for comparison needed to achieve required accuracy can increase or decrease appropriately.

Also, in the embodiments described above, the reception of the contents within the same subframe and the comparison with the expected code sequence were described taking the locations of word 1 and word 2 as the center. However, the reception may be limited to subframe 1, and the WN of word 3 may be included. Alternatively, the reception may not be limited to subframe and may include data from other subframes. Furthermore, the expected code sequence may be generated by using data from adjacent subframes.

In the embodiments described above, the fact that it is preferable that a code sequence that change according to the transmission period (subframe) be included in the expected code sequence was described. However, the expected code sequence may be generated from only the code sequences that change in this way or may be combined with invariant code sequences.

The description above used the storage unit 63 made of non-volatile memory as a computer-readable medium for operation processing programs related to measurements such as the time zone calculation processing involved in the processing operations of the module CPU 61 of the present invention as an example, but the present invention is not limited to this.

A portable storage medium such as a HDD (hard disk drive), a CD-ROM, or a DVD disk can be used as an alternative computer-readable medium. As a medium that provides program data related to the present invention via telecommunication lines, a carrier wave is applicable to the present invention.

Besides what is described above, the specific configurations shown in the embodiments described above, the contents and steps of operations, and the like can be appropriately modified without departing from the spirit of the invention.

Several embodiments of the present invention were described, but the scope of the present invention is not limited to these and includes the scope of the invention as described in the claims and the equivalents thereto.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A radio-controlled timepiece, comprising:
a radio wave reception unit that receives satellite waves and extracts an incoming code sequence formatted in a prescribed format from said received satellite waves; and
a processor that generates in advance an expected code sequence that is expected to be part of said incoming code sequence and detects said expected code sequence within said incoming code sequence by sequentially comparing said expected code sequence with said incoming code sequence, the processor determining a present date/time, as indicated by the satellite waves, in accordance with a timing at which said detected code sequence occurs within said incoming code sequence as measured by time kept by the timepiece,
wherein said expected code sequence includes codes that change with a transmission period during which time-related information that includes satellite date/time contained in the satellite waves, which is formatted in said prescribed format, is transmitted.

2. The radio-controlled timepiece according to claim 1, further comprising:
a counter unit that counts a date/time of said radio-controlled timepiece,
wherein said processor determines an error in said date/time counted by said counter unit in accordance with said timing at which said detected code sequence occurs within said incoming code sequence, which is measured in said date/time counted by the counter unit.

3. The radio-controlled timepiece according to claim 1, further comprising:
a counter unit that counts a date/time of said radio-controlled timepiece,
wherein said processor, in accordance with said date/time counted by said counter unit, generates said expected code sequence that includes a prescribed number of low-order bits that are part of a code sequence representing said time-related information and determines said present date/time in accordance with said timing at which said detected code sequence occurs within said incoming code sequence as measured in said date/time counted by said counter unit.

4. The radio-controlled timepiece according to claim 3, wherein, if a time that is longer than or equal to said transmission period elapses without said expected code sequence being detected from said incoming code sequence, then said processor renews said expected code sequence in accordance with time-related information that is transmitted after said transmission period.

5. The radio-controlled timepiece according to claim 3, wherein said processor determines whether an estimated error in said counter unit, which is estimated based on an elapsed time from a most recent time when said date/time of said counter unit was corrected, is greater than or equal to a reference time that is set based on said transmission period, and if said processor determines said error to be not greater than or equal to said reference time, said processor determines said present date/time based on said expected code sequence that includes said prescribed number of low-order bits.

6. The radio-controlled timepiece according to claim 3, wherein said time-related information that is included in said expected code sequence includes a value that corresponds to a period number indicating a number of said transmission period.

7. The radio-controlled timepiece according to claim 3, wherein said processor starts comparing said incoming code sequence with said expected code sequence at a moment in time that is before an estimated start time at which said expected code sequence is predicted to start in said incoming code sequence in said date/time counted by said counter unit and that is within one said transmission period measured from said estimated start time.

8. The radio-controlled timepiece according to claim 7, wherein said processor estimates a range of error in said counter unit based on a time interval elapsed since a most recent time when said date/time counted by said counter unit was corrected and derives said estimated start time at which said expected code sequence is predicted to start in said incoming code sequence in accordance with said estimated range of error in said counter unit.

9. The radio-controlled timepiece according to claim 8, wherein said radio wave reception unit determines a timing of when to start receiving said satellite waves based on said moment in time at which said processor starts comparing said incoming code sequence with said expected code sequence.

10. The radio-controlled timepiece according to claim 8, wherein said radio wave reception unit starts receiving said satellite waves at a preset time interval prior said moment in time at which said processor starts comparing said incoming code sequence with said expected code sequence.

11. The radio-controlled timepiece according to claim 1, wherein a length of said expected code sequence is set such that a probability that said expected code sequence occurs in a location that is not expected within said incoming code sequence is lower than a prescribed reference value.

12. The radio-controlled timepiece according to claim 11, wherein said probability is computed by assuming that, in each of binary code bits that constitute said incoming code sequence, a probability that 0 occurs and a probability that 1 occurs are ½, respectively.

13. The radio-controlled timepiece according to claim 11, wherein said prescribed reference value is set according to a number of times said radio wave reception unit is expected to receive said satellite waves during an expected lifespan of the radio controlled timepiece.

14. The radio-controlled timepiece according to claim 1, wherein a length of said expected code sequence is set to be shorter than a length of a data block that includes: invariant code sequences that do not change with said transmission period; satellite time information; and an error correction code for said satellite time information.

15. The radio-controlled timepiece according to claim 14, wherein said satellite waves are sent from a Global Positioning Satellite, and said length of said data block has a length of 2 words.

16. The radio-controlled timepiece according to claim 1, wherein a transmitted code sequence that corresponds to content in transmitted information from a positioning satellite that transmits said satellite waves in said prescribed format includes inversion codes, said transmitted code sequence having unit blocks that are preset, and for each of the unit blocks, the corresponding inversion code determining whether to invert code bits in the unit block before said transmitted code sequence is transmitted, and
wherein said processor generates one expected code sequence that includes a code sequence in which each of the code bits in each of said unit blocks within said expected code sequence are inverted one said unit block at a time and another expected code sequence that includes another code sequence in which said each of the code bits are not inverted and compares both said one expected code sequence and said another expected code sequence with said incoming code sequence.

17. The radio-controlled timepiece according to claim 1, further comprising:
a storage unit that stores a reception history of most recently received satellite waves and a code sequence that is obtained from said most recently received satellite waves,
wherein said processor determines, based on types of information represented by said code sequence that is stored in said storage unit, a part of said code sequence that does not change within a time interval between when said most recently received satellite waves were received and a present moment and includes at least a portion of said part in said expected code sequence.

18. A radio-controlled timepiece comprising:
a radio wave reception unit that receives satellite waves and extracts an incoming code sequence formatted in a prescribed format from said received satellite waves;
a processor that generates in advance an expected code sequence that is expected to be part of said incoming code sequence and detects said expected code sequence within said incoming code sequence by sequentially comparing said expected code sequence with said incoming code sequence, the processor determining a present date/time, as indicated by the satellite waves, in accordance with a timing at which said detected code sequence occurs within said incoming code sequence as measured by time kept by the timepiece; and
a storage unit that stores a reception history of most recently received satellite waves and a code sequence that is obtained from said most recently received satellite waves,
wherein said processor determines, based on types of information represented by said code sequence that is stored in said storage unit, a part of said code sequence that does not change within a time interval between when said most recently received satellite waves were received and a present moment and includes at least a portion of said part of said code sequence in said expected code sequence.

19. A method of determining date/time information performed by a processor that communicates with a radio wave reception unit that receives satellite waves and extracts an incoming code sequence formatted in a prescribed format from said received satellite waves, the method comprising:
generating in advance an expected code sequence that is expected to be part of said incoming code sequence;
detecting said expected code sequence within said incoming code sequence by sequentially comparing said expected code sequence with said incoming code sequence, and
determining a present date/time, as indicated by the satellite waves, in accordance with a timing at which said detected code sequence occurs within said incoming code sequence as measured by time kept by the processor,
wherein said expected code sequence includes codes that change with a transmission period during which time-related information that includes satellite date/time contained in the satellite waves, which is formatted in said prescribed format, is transmitted.

20. A non-transitory storage medium that stores instructions executable by a processor communicating with a radio wave reception unit that receives satellite waves and extracts an incoming code sequence formatted in a prescribed format from said received satellite waves, said instructions causing the processor to perform the following:
generating in advance an expected code sequence that is expected to be part of said incoming code sequence;
detecting said expected code sequence within said incoming code sequence by sequentially comparing said expected code sequence with said incoming code sequence, and
determining a present date/time, as indicated by the satellite waves, in accordance with a timing at which said detected code sequence occurs within said incoming code sequence as measured by time kept by the processor,
wherein said expected code sequence includes codes that change with a transmission period during which time-related information that includes satellite date/time contained in the satellite waves, which is formatted in said prescribed format, is transmitted.

* * * * *